June 8, 1965     H. G. A. WINTER     3,187,816
FLUID POWER SCREW
Filed Dec. 28, 1962     2 Sheets-Sheet 1
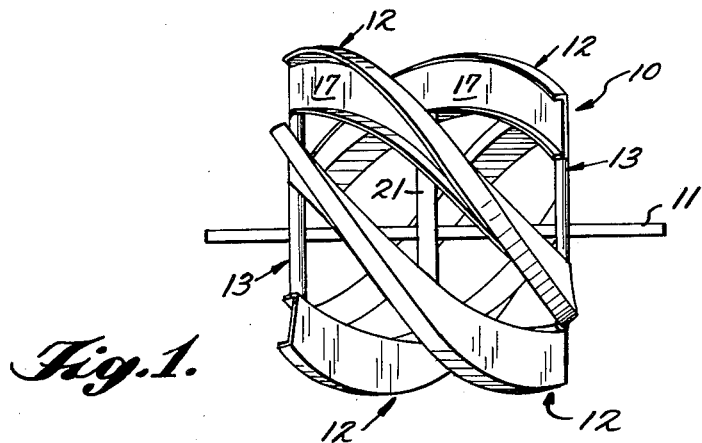
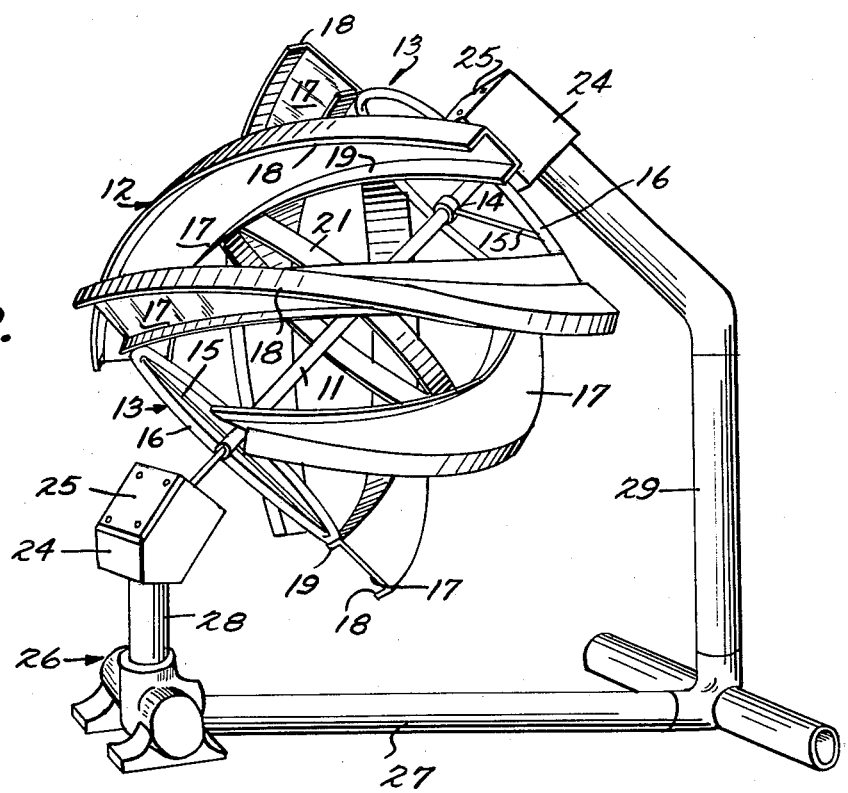
INVENTOR
HERMAN G. A. WINTER
BY Cushman, Darby & Cushman
ATTORNEYS

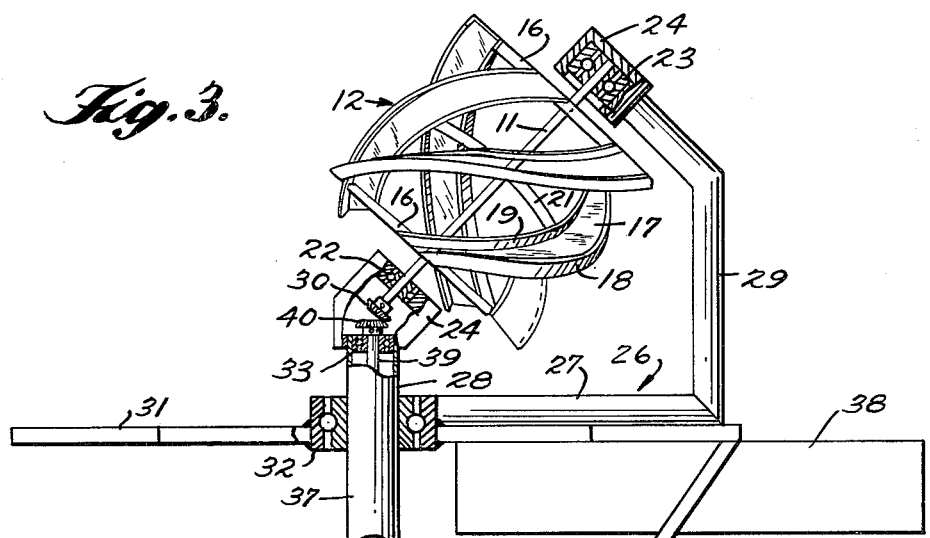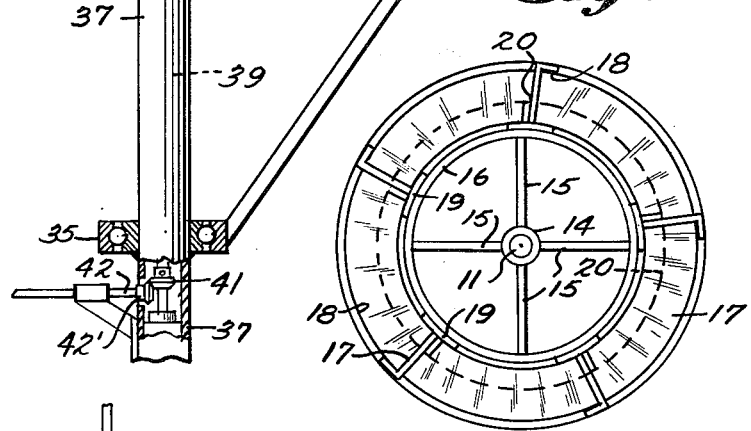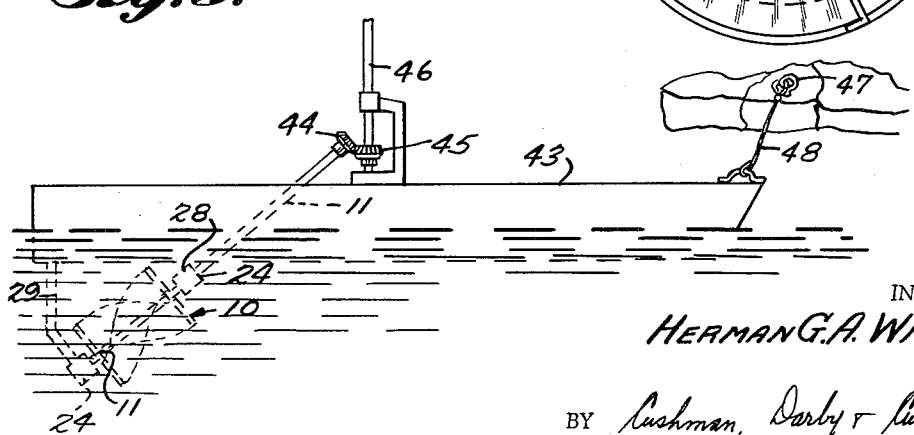

United States Patent Office 3,187,816
Patented June 8, 1965

3,187,816
FLUID POWER SCREW
Herman G. A. Winter, 812 Bennett Ave.,
American Falls, Idaho
Filed Dec. 28, 1962, Ser. No. 247,939
15 Claims. (Cl. 170—8)

This invention relates to a fluid power screw of the type that can be driven by the force of a fluid acting against the vanes of the rotor.

Windmills, water wheels or fluid power screws have been used for providing the mechanical force to drive many and various devices. However, the usual type of windmill, water wheel or power screw has certain disadvantages and efficiency losses which are overcome by the present invention.

In accordance with the present invention, there is provided a power screw which will be driven by a fluid current and produce cheap mechanical power for operating various devices such as generators, pumps, motors, refrigeration machinery and compressors.

It is therefore an object of this invention to construct a fluid power screw which will give maximum efficiency whether it be driven by wind or water.

A further object is to construct the fluid power screw in such a manner that one of the legs of the supporting frame is of a shorter length than the other leg so that the shaft of the screw is at an angle to the plane of the supporting surface.

Still a further object is to choose the angle at which the shaft is positioned to permit the vanes of the rotor to utilize the full force of the motive fluid. By setting the rotor at an angle which is calculated in accordance with the helical angle of the vanes of the rotor, maximum efficiency is obtained when a motive fluid acts on the vanes.

Still a further object is to mount the vanes of the rotor on the shaft in such a manner that there is a space between the shaft and the bottom edge of the vanes. This arrangement prevents the forming of a pocket-like area which would induce turbulence of the motive fluid after it struck the vanes and produce an inefficient power screw.

Another object is to provide the vanes of the rotor with a fluid working surface and with a fluid restraining surface. The restraining surface is constructed as a flange to the working surface and prevents the escape of the motive fluid due to centrifugal force, with a result that the motive fluid would act almost entirely on the working surface.

Still a further object is to provide a power screw which will work just as efficiently in a water stream as in an air stream. When used as a water-operated power screw, the frame is mounted on a float structure which is permitted to move into the stream, but being secured to an anchor by means which will allow the float to rotate on the surface of the stream. This rotation of the float will permit the screw to be presented to the direct flow of the stream. When used as an air screw, the frame may be mounted on a support high in the air or at ground level, and it will work with equal efficiency in either position. The support may be a movable support such as a truck, train or boat, or a rotatable base on a stationary support, which mounting permits the screw to assume a position directly in the flow of the air stream.

Another object is the mounting of the frame of the screw on the rotating base, particularly in the case of an air-operated screw, in such a way that it will immediately face into the wind stream and not hunt back and forth as it tries to obtain its working position.

Still a further object is to provide a power take-off means in connection with the shaft of the rotor to furnish the necessary power to operate various devices, for example, generators, pumps, motors, refrigeration machinery and compressors.

Further objects and the entire scope of the invention will be apparent from the following detailed description of the illustrative embodiments and from the appended claims. The illustrative embodiments may be best understood by reference to the accompanying drawings, wherein:

FIGURE 1 is a side elevation of the rotor of a power screw of the invention;

FIGURE 2 is a perspective view of the rotor mounted in its frame;

FIGURE 3 is a side elevation view of one embodiment of a power screw of the invention mounted for use, partially broken away to show the bearing and power take-off structure;

FIGURE 4 is an end view of the rotor of FIGURE 1 showing the reinforcing strip; and FIGURE 5 is a side elevation of another embodiment of the invention.

Referring now more particularly to the drawings, the present device comprises a power screw rotor generally indicated at 10 (FIGURE 1) having a shaft 11 coincident with the longitudinal axis thereof and a plurality of vanes 12 extending helically with respect to the shaft 11 and fixedly spaced at a uniform distance therefrom. The vanes 12 are held at a spaced distance from the shaft 11 by a plurality of spacer rings 13. The spacer rings 13 are each composed of an inner hub 14 (FIGURE 4) having a hole bored longitudinally therethrough that has substantially the same diameter as the shaft 11, a plurality of spokes 15 extending radially from the hub 14 and an outer rim 16 fixedly secured as by welding to the outer extremities of the spokes 15. The spacer rings 13 are mounted on the shaft 11 disposed longitudinally from each other and secured to the shaft by hubs 14 to which they are spot welded or secured by set screws (not shown) so that each spacer ring 13 extends from the shaft 11 in a plane perpendicular to the longitudinal axis of the shaft. The helical vanes 12 have the radially inner surfaces thereof fixedly secured to the outer surfaces of the rims 16 as by soldering or welding.

Other intermediate spacer rings 21 having no spokes or hubs may be secured to the helical vanes 12 to provide additional rigidity to the rotor structure.

Each helical vane 12 is formed from a channel-like member having a fluid working surface 17, a fluid restraining surface 18, and a radially extending inner spacer ring mounting surface 19. The spacer ring mounting surface 19 may extend rearwardly of the fluid working surface 17 to aid in reinforcing the fluid working surface. The fluid restraining surface 18 and the spacer ring mounting surface 19 are substantially perpendicular to the fluid working surface 17. Alternately, the fluid restraining surface 18 and the spacer ring mounting surface 19 may be formed from the flanges of angle irons mounted on a planar helical strip as by welding by nut and bolt fastenings, or any other suitable manner. A reinforcing strip or band 20 may be secured to the reverse side of the fluid working surface 17 as best shown in FIGURE 4.

The frame generally indicated at 26 (FIGURE 2) includes a supporting base 27 and legs 28 and 29. The leg 28 is shorter than the leg 29 by an amount calculated so that a generally horizontal fluid stream impinging on the vanes 12 will apply its force to the working surfaces 17 so as to do the most useful work, i.e., to rotate the rotor most efficiently. The efficiency of the rotor depends both on the angle between the rotor shaft and the direction of fluid flow, and on the angle which the helical vane makes with the rotor shaft, i.e., the helical angle. The maximum speed of rotation is obtained when both of these angles approximate a 45° angle.

The outer ends of the legs 28 and 29 have secured thereto bearing housings 24. Mounted in each of the housings 24 is a bearing 22 and 23, and rotatably mounted in these bearings is the rotor 10. Cover plates 25 are removably mounted on the housings 24 in order that the mechanism contained therein may be serviced.

In the embodiment of the invention shown in FIGURE 3, the lower end of the shaft 11 extends through its bearing 22 and has a bevel gear 30 fixedly secured coaxially therewith. The base 27 is secured to a rotatable platform 31 as by bolts (not shown). The shorter leg 28 of the support is secured to a hollow stationary shaft 37 by any suitable means and extends upwardly therefrom. Shaft 37 is journaled in the rotatable platform 31 by a bearing 32 having an inner race secured to the shaft 37 and an outer race secured to the platform 31. A vane or skirt 38 is secured to the platform 31 in a position so that it aids in turning the fluid power screw into the full force of the fluid stream. As shown in FIGURE 3, the skirt 38 depends from the platform, but it is understood it could be located in other positions where it will perform the same function. The rotatable platform 31 is braced by a strut 34 extending between the outer edge of the platform and the outer race of a bearing 35. The inner race of bearing 35 is secured to the stationary shaft 37. The bearing housing 24 for the lower end of the shaft 11 is mounted on the outer end of leg 28 and coacts therewith to permit the housing to rotate around the hollow shaft 37 in conjunction with the rotatable platform 31. The lower end of shaft 37 may be secured to the ground, a building or the like. A longitudinally rotatable power take-off shaft 39 extends within the hollow shaft 37, being coaxial therewith. The upper end of the power take-off shaft is journalled in the bearing 33 and terminates in a bevel gear 40 fixedly secured coaxially therewith as by a set screw.

The lower end of the power take-off shaft 39 has a bevel gear 41 fixedly mounted coaxially therewith, and a second shaft 42 of a suitable power take-off means is engaged therewith by gear 42′ meshing with gear 41.

The bevel gear 40 mounted at the upper end of the power take-off shaft 39 operably engages the bevel gear 30 which is fixedly secured to the rotor shaft 11 so that when the rotor is turned by the force of the fluid stream or current acting on the vanes 12, the rotational motion of the shaft 11 is transmitted to the power take-off shaft 39 and then to the power take-off means 42 by the bevel gear 41, secured to the lower end of the power take-off shaft 39 engaging bevel gear 42′ carried by shaft 42.

In this embodiment of the invention shown in FIGURE 3, the axis of rotation of the support base 27 and platform 31 and the power take-off shaft 39 are mutually coaxial with the shorter leg 28 of the support 26.

In the operation of this embodiment of my invention, the shaft 37 is mounted near a place where power is desired and may be supported on the ground, on a building or on any vehicle.

When a fluid current such as an air stream moves horizontally past the fluid power screw as by a wind flowing past a stationarily mounted device or by the air moving relative to a vehicle mounted power screw as the vehicle moves, the rotatable platform 31 is rotated by the skirt 38 so that the power screw is directed into the full force of the fluid stream. Because the fluid power screw has been mounted on the support 26 at an optimum angle to a horizontally directed fluid stream, the fluid stream impinges on the vanes 12 of the rotor 10 at the most efficient angle and rotates the rotor with the maximum speed possible using the particular fluid stream. If the direction of the fluid stream should change, the skirt 38 automatically aids in rotating the power screw into the full force of the fluid stream without the rotor hunting back and forth to find this optimum position. The mounting of the frame with the smaller leg being coaxial with the point of rotation of the base also aids in the rotor locating itself with respect to the fluid stream.

As the fluid stream impinges on the vanes 12, the force of the fluid on the working surfaces 17 rotates the vanes and the shaft 11 secured thereto. As the rotor gains rotary speed, the fluid that has impinged on the leading edges of the working surfaces 17 is confined to act on these working surfaces 17 throughout the length thereof by the fluid restraining surfaces 18 which act to prevent the fluid from passing radially from the working surfaces before reaching the trailing edges thereof due to centrifugal force.

The space that is provided between the helical vanes 12 and the shaft 11 allows portions of the fluid current that are not entrapped on a working surface to pass through the rotor without causing power wasting eddys and turbulence as would be the case if the helical vanes extended radially inward to the shaft 11.

The rotary motion imparted to the shaft 11 by the action of the fluid on the vanes of the rotor is transmitted by the power take-off means to the mechanical power input of any pump, generator, compressor or the like. Thus an inexpensive source of mechanical power is provided which most efficiently utilizes the force of a fluid stream that either flows past the fluid power screw, as in the case of a stationarily mounted device, or that which is created by the screw moving relative to its surroundings as when mounted on a land, air or water vehicle.

In FIGURE 5 another embodiment of the invention is shown wherein the fluid power screw is mounted beneath a barge or float. The fluid power screw rotor is mounted as hereinbefore described in suitable bearings enclosed within bearing housings 24. The bearing boxes are mounted in the extremities of the longer leg 29 and the shorter leg 28 which depend from and are fixedly secured to the lower surface of the barge or float 43 which is supported by and floats on the upper surface of a fluid such as water. The shaft 11 of the fluid power screw extends through the bearing supported by the shorter leg 28 and protrudes through the upper surface of the barge or float 43. A bevel gear 44 is fixedly secured coaxially with the upper end of the extension of the shaft 11 at a point above the upper surface of the barge or float 43. The bevel gear 44 cooperates with a bevel gear 45 that is fixedly coaxial with a suitable rotatably mounted power take-off shaft 46. The power take-off shaft may be connected to the mechanical power input of any device utilizing rotary mechanical power.

The barge or raft 43 is swingably secured by a point near the periphery thereof that is closer to the shorter leg 28 of the support than the longer leg 29 to a fixed point 47 as by a cable 48. Alternately, the cable 48 may be secured to a powered boat or vessel (not shown).

In the operation of the embodiment of the invention shown in FIGURE 5, the barge or float 43 is anchored to the shore of a flowing body of water by the cable 48 and carries a device using rotary mechanical power (not shown) such as a compressor, pump, generator or the like operably engaged with the power take-off shaft 46. Because the fluid power screw is positioned beneath the barge or float 43 so that the shorter leg 28 of the support is closer to the point of securement of the barge or float to the shore than is the longer leg 29 of the support, the barge or float carrying the fluid power screw will automatically position itself on the surface of the fluid stream so that the maximum force of the fluid current impinges on the vanes of the rotor 10. Again the legs 28 and 29 are of such a difference in length that the rotor supported between them presents its helical vanes to the working fluid at the optimum angle. The legs 28 and 29 are of such a length that the angle between the rotor shaft and the direction of fluid flow is a 45° angle, this angle being the one that causes the greatest rotation of the rotor where the helical angle of the vanes is approximately 45°.

The flowing water impinging on the vanes 12 rotates the rotor 10 including the shaft 11. This rotary motion is transmitted by the bevel gear 44 to the power take-off shaft through its cooperating bevel gear 45. The rotary motion thus imparted to the power take-off shaft is transmitted to a user of rotary mechanical power.

The fluid power screw rotor 10 shown in the embodiment of the invention in FIGURE 5 is similar in all respects to the rotor shown in FIGURES 1–4 and is in fact interchangeable with the rotor of the embodiment of the invention shown in FIGURE 3.

As an alternative to anchoring the barge or float of FIGURE 5 to the shore of a flowing body of water, the barge or float may be towed behind a powered vessel that is moving through either a flowing or non-flowing body of water. In this alternative, the motion of the barge or float relative to the fluid causes the fluid to rotate the fluid power screw rotor and provide power to the power take-off shaft 46.

It should be realized that although power take-off means of a particular construction and geometry have been shown, that any of several methods for utilizing the power of the fluid power screw may be employed or the device may be used without a power take-off means, for instance, as a child's toy.

Although embodiments of the invention have been shown for the purpose of clearly illustrating the invention, it should be realized that many modifications may be made without departing from the principles of the invention and therefore this invention embraces all modifications encompassed within the spirit and scope of the following claims.

What is claimed is:

1. A fluid power screw having a support, said support comprising a base and a frame, said frame having two legs rigidly secured to said base, one of said legs being of a length substantially shorter than that of the other of said legs, bearings mounted in the outer extremities of said legs, a shaft extending between said legs and rotatably mounted in said bearings, said shaft having a plurality of helical vanes secured thereto at a fixed distance therefrom to permit a motive fluid, in which said vanes and said shaft are immersed, to act directly on those vanes first presented to the fluid flow and also to act on other vanes after passing between said first vanes and said shaft, all vanes so acted upon causing rotation of the shaft.

2. A fluid power screw having a support, said support comprising a base and a frame, said frame having two legs rigidly secured to said base, one of said legs being substantially shorter than the other, bearings mounted in the outer extremities of said legs, a shaft extending between said legs and rotatably mounted in said bearings, said shaft having a plurality of helical vanes secured thereto at a constant radial distance therefrom to permit a motive fluid, in which said vanes and said shaft are immersed, to act directly on those vanes first presented to the fluid flow and also to act on other vanes after passing between said first vanes and said shaft, all vanes so acted upon causing rotation of the shaft.

3. A fluid power screw for use in a fluid stream as in claim 2, wherein the legs are of such a difference in length that the maximum force of the fluid stream acts on said vanes.

4. A fluid power screw for use in a fluid stream, said power screw having a rotatable support, said support comprising a base and a frame, said frame comprising two legs which are perpendicular to said base and rigidly secured thereto, one of said legs being substantially shorter than the other, bearings mounted in the outer extremities of said legs, a rotor extending between said legs and rotatably mounted in said bearings, said rotor including vanes rigidly secured to a shaft at a fixed distance therefrom, said vanes causing said rotor to rotate due to the force of a fluid acting on the vanes, and means secured to said support for maintaining the power screw in the flow stream of the fluid.

5. A fluid power screw having a support, said support comprising a base and a frame, said frame having two legs rigidly secured to said base, one of said legs being of a length substantially shorter than that of the other of said legs, bearings mounted in the outer extremities of said legs, a shaft extending between said legs and rotatably mounted in said bearings, said shaft having a plurality of helical vanes arranged thereon and secured thereto at a spaced distance therefrom, said arrangement providing means for a motive fluid in which said vanes and said shaft are immersed, to act directly on those vanes first presented to the fluid flow and also to act on other vanes after passing between said first vanes and said shaft, all vanes so acted upon causing rotation of the shaft.

6. A fluid power screw having a support, said support comprising a base and a frame, said frame having two legs rigidly secured to said base, one of said legs being of a length substantially shorter than that of the other of said legs, bearings mounted in the outer extremities of said legs, a shaft extending between said legs and rotatably mounted in said bearings, a power take-off means secured to one end of the shaft, said shaft having a plurality of helical vanes secured thereto at a fixed distance therefrom to permit a motive fluid, in which said vanes and said shaft are immersed, to act directly on those vanes first presented to the fluid flow and also to act on other vanes after passing between said first vanes and said shaft, all vanes so acted upon causing rotation of the shaft.

7. A fluid power screw having a rotatable support, said support comprising a base and a frame, said frame having two legs rigidly secured to said base, one of said legs being of a length substantially shorter than that of the other of said legs, bearings mounted in the outer extremities of said legs, a shaft extending between said legs and rotatably mounted in said bearings, a power take-off means secured to one end of the shaft, the axis of said means being coaxial with the longitudinal axis of the shorter leg of said frame, said shaft having a plurality of helical vanes secured thereto at a fixed distance therefrom, said vanes and shaft rotating due to the force of a fluid acting on the vanes.

8. A fluid power screw having a support comprising a base and a frame, said base floating on a surface of a flowing body of water and being confined to rotating movement on said surface, said frame having two legs secured to said base and extending below said surface, one of said legs being of a length substantially shorter than that of the other of said legs, bearings mounted in the outer extremities of said legs, a shaft extending between said legs and rotatably mounted in said bearings, said shaft having a plurality of helical vanes secured thereto at a fixed distance therefrom, said vanes and shaft rotating due to the force of the flowing water against the vanes.

9. A fluid power screw as in claim 8, wherein the legs depend from the base.

10. A fluid power screw as in claim 8, wherein the base of the support rotates about an axis that is perpendicular to the base and passes through a point near the periphery of the base, said point being located nearer said shorter leg than the longer leg.

11. A fluid power screw having a support, said support comprising a base and a frame, said frame having two legs rigidly secured to said base, one of said legs being of a length substantially shorter than that of the other of said legs, bearings mounted in the outer extremities of said legs, a rotor extending between said legs and rotatably mounted in said bearings, said rotor including helical vanes rigidly secured to a shaft at a fixed distance therefrom, each of said vanes having a surface against which a working fluid stream acts, rotating said rotor, and an upstanding flange at the outer edge of said surface which confines said working fluid on said surface against the action of centrifugal force.

12. A fluid power screw having a support, said support comprising a base and a frame, said frame having two legs rigidly secured to said base, one of said legs being of a length substantially shorter than that of the other of said legs, bearings mounted in the outer extremities of said legs, a rotor extending between said legs and rotatably mounted in said bearings, said rotor including helical vanes, a shaft and means for rigidly securing said vanes to said shaft at a fixed distance from said shft, each of said vanes having a fluid driven surface and a fluid restraining surface, said fluid driven surface being substantially perpendicular to said fluid restraining surface.

13. A fluid power screw having a rotor as in claim 11, wherein the surface against which the working fluid stream acts is reinforced by additional means secured to the reverse side thereof.

14. A fluid power screw for use in a fluid stream, said power screw having a rotatable support, said support comprising a base and a frame, said frame having two legs which are perpendicular to said base and are secured thereto, one of said legs being substantially shorter than the other, said base being mounted for rotation about an axis that is substantially coaxial with said shorter leg to prevent the power screw from hunting when acted upon by the fluid current, bearings mounted in the outer extremities of said legs, a shaft extending between said legs and rotatably mounted in said bearings, said shaft having a plurality of vanes secured thereto at a fixed distance therefrom, said vanes and said shaft rotating due to the force of a fluid acting on the vanes, and means secured to said support for maintaining the power screw in the flow stream of the fluid.

15. A fluid power screw having a support, said support comprising a base and a frame, said frame having two legs rigidly secured to said base, one of said legs being of a length substantially shorter than that of the other of said legs, bearings mounted in the outer extremities of said legs, a rotor extending between said legs and rotatably mounted in said bearings, said rotor including helical vanes rigidly secured to a shaft at a fixed distance therefrom, each of said vanes having a surface against which a working fluid stream acts to rotate said rotor, and upstanding flanges at both the inner and outer edges of said surface, said flanges confining a portion of said working fluid for flow along the helical length of said surface to permit maximum utilization of the working fluid in rotating said rotor.

References Cited by the Examiner

UNITED STATES PATENTS

| | | | |
|---|---|---|---|
| 109,458 | 11/70 | Sharps | 115—34 |
| 323,734 | 8/85 | Randall | 170—97 |
| 953,891 | 4/10 | Atkins | 170—97 |
| 973,004 | 10/10 | Crago | 170—97 |
| 1,035,003 | 8/12 | Gunther | 170—176 |
| 1,349,077 | 8/20 | McChesney | 170—133 |
| 1,908,631 | 5/33 | Taylor | 170—141 |
| 2,454,058 | 11/48 | Hays | 170—8 |

FOREIGN PATENTS

| | | |
|---|---|---|
| 51,594 | 1912 | Austria. |
| 656,229 | 12/28 | France. |
| 5,273 | 1879 | Great Britain. |

JULIUS E. WEST, *Primary Examiner.*